May 7, 1963 G. B. HAHN 3,088,747
CONVERTIBLE BICYCLE FRAME
Filed Aug. 21, 1961

INVENTOR.
GILBERT B. HAHN
BY Williams, Tilberry & Golrick
ATTORNEYS

United States Patent Office 3,088,747
Patented May 7, 1963

3,088,747
CONVERTIBLE BICYCLE FRAME
Gilbert B. Hahn, Nashville, Tenn., assignor to The Murray Ohio Manufacturing Company, Nashville, Tenn., a corporation of Ohio
Filed Aug. 21, 1961, Ser. No. 132,806
10 Claims. (Cl. 280—7.11)

The present invention is generally concerned with bicycle frames, and more particularly with a bicycle frame which is convertible at will from a boy's to a girl's style frame and vice versa.

Currently and for some time past, two distinct styles of bicycles have been popular for use respectively by boys and girls and, for that matter, by men and women. Although the distinctiveness arises essentially from a difference in the bicycle frames, the frames are similar in basic structure, comprising a head post tube journalling the front wheel steering fork tang, a lower rear wheel fork, a main front reach tube with respective ends joined to the head post tube and to the lower rear fork, a seat mast tube rising from the region where the front reach tube and lower rear fork are joined, and an upper rear fork structure providing a pair of struts with lower ends connected to the ends of respective lower fork prongs and upper ends connected to the upper portion of the seat mast tube. These several elements are connected into a rigid frame structure usually by welding or brazing either by direct joining of the elements or through interposed components such as joint fittings or a pedal hanger housing commonly forming a joint element between lower rear fork, front reach tube and seat mast tube.

In addition to such basic structure, common to frames of both boy's and girl's style bicycle, an additional tube or pair of tubes is incorporated which by differences in location and shape provide the two types of frames distinctive of the respective styles. A single upper reach tube or pair of tubes, running between the top portions of the head post and seat mast tubes, distinguish the frame for a boy's style frame from the girl's, where the upper reach tube or pair of tubes runs from the top of the head post down at least to a point on the lower part of the seat mast tube, being often disposed in roughly parallel relation to the lower reach. Frequently a so-called tank is disposed below the upper reach tube; and shape differences of the upper reach tubes in the two frame types usually entail use of different type tanks. Here again the upper reach tubes are welded or brazed to the other tubular elements of the frame.

In consequence of such structure, generally to provide a boy's style and a girl's style bicycle, distinct basic frames have to be used in cases where the frame is to include an upper reach tube of the character described. For the manufacturer this, of course, involves the fabrication of two distinct types of frames and of any auxiliary item, such as a tank, the structure of which would be affected by the upper reach tube shape or location; and therefore also entails the assembly, packaging and shipping of two distinct type bicycles, with corresponding accounting and inventory problems both for the manufacturer and for dealers.

By the present invention there is provided a bicycle frame structure which includes a tank and is convertible from one frame style to the other by change of tank position, thereby eliminating the disadvantages of prior practice in supplying the demand for distinct styles of boy's and girl's bicycles. Further, the embodiment of the invention hereinafter disclosed is especially adapted for use in the smaller dismantleable type bicycles in which the seat mast tube, the upper rear struts or fork and supporting structures of the pedal hanger are separable from a unitary sub-assembly of lower rear fork, lower front reach tube and head tube, so that the bicycle can be packed and shipped in disassembled form and assembled by the dealer or purchaser.

It is proposed here that there be provided a hollow tank structure formed of sheet metal with front and rear ends embracing and removably secured to the head post tube and the smaller seat mast tube respectively.

The shape of the head post tube embracing front end portion and the mutual disposition of the head post tube and seat mast tube are such that the tank can be secured in an upper position with front end anchored at the upper part of the head post tube and rear end secured near the upper part of the mast tube to form a boy's type frame; and also the tank may be inverted and with the front end anchored at the same position, the rear end may be secured lower along the seat mast tube to provide a girl's style frame. The tank, therefore, assumes the styling function of both the upper reach tube and tank of prior bicycles.

Thus only one type of frame structure, one type of tank, one type bicycle need be fabricated and shipped by the manufacturer to distributors and dealers, and the ultimate purchaser may assemble or at any time convert the bicycle at his option into either boy's or girl's style. To the purchaser, particularly of a bicycle for younger children which may be handed down from one child to another of opposite sex, this offers the distinct advantage that the bicycle is not rejected by a child because it is of a style used by the opposite sex.

The general object of the present invention is then to provide a bicycle frame which is convertible to either a boy or girl style frame. Another object of the invention is to provide a frame of the character described which is particularly adaptable to smaller bicycles of the type generally shipped by the manufacturer in disassembled condition. A still further object of the present invention is to provide a basic bicycle frame structure of the character described which is readily converted from one style to the other by a simple detachment, change in position and resecuring of a tank structure. Other objects and advantages of the invention will appear from the following description and the drawings wherein:

Figure 1:
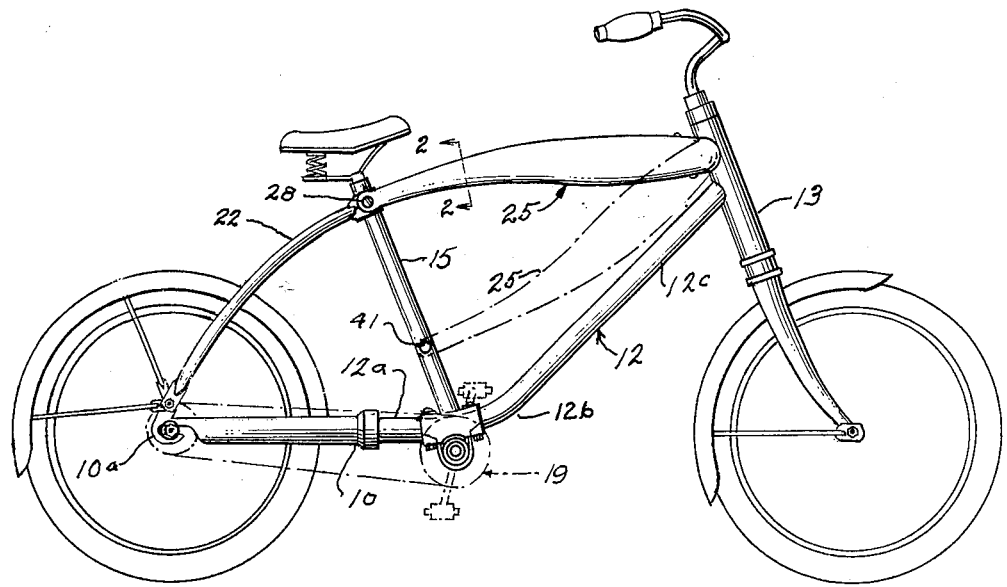
FIG. 1 is a right side elevational view of a bicycle including a basic frame structure according to the present invention showing a combined tank and upper front reach tube disposed as for a boy's style frame, the same being shown in dashed outline position as used for a girl's style frame.
Figure 5:
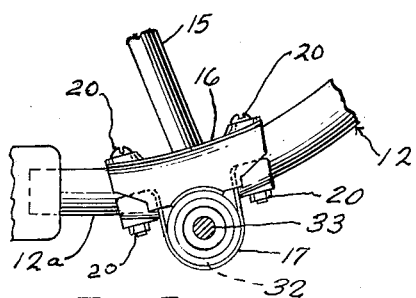
FIG. 5 is a detail of a seat mast tube anchoring and pedal hanger bearing clamping structure.

In FIG. 1 of the drawings there is shown in side elevation a bicycle with a frame construction of the general type disclosed in the Schreckengost and Hahn U.S. Patent 2,798,739. The frame includes a roughly horizontally disposed rear fork structure 10 having rearwardly extending prongs between which the rear wheel of the bicycle is mounted. A main or lower front reach tube 12 has a portion 12a extending out of the yoke portion of the fork 10 and through a curved portion 12b running into an approximately straight main portion 12c extending up to and secured in the back portion of the head post 13 in which the tang or stem of a front steering wheel fork of usual type is swivel mounted. A straight rearwardly inclined tubular member 15, as a seat post mast structure supporting in its upper end the stem or tang of a seat, is secured at the curved portion 12b on main tube 12 by a clamping arrangement including an upper saddle portion 16 conformed to the curvature of the tube 12b and brazed to the lower end of the mast tube 15, and a second saddle shaped member 17 cooperates with the member 16 in forming a clamping housing for a bearing structure of a pedal and sprocket assembly shown in dashed outline at 19, located below tube 12 in contrast with the arrangement of the aforesaid patent. As may be best seen in FIG. 5 a pair of common clamping bolts 20 extending through the upper saddle 16, the curved portion 12b of the tube 12 and the lower saddle 17 secure not only the mast tube 15 in position but also the two clamping members 16, 17 in mutual relation for support of the pedal and sprocket assembly as in the aforesaid patent by clamping the bearing assembly 32 through which passes the pedal crank shaft portion 33.

The upper rear fork structure, comprised of a pair of struts, joined by a cross brace or strut for strength and for support of a rear fender in known fashion, is secured at its upper end on the top portion of the tube 15 by suitable screw or bolt means 28, the struts or prongs thereof being curved in rearwardly and downwardly divergent relation to points where respective lower ends are secured by bolts or the like to the rear wheel axle receiving and mounting clip portions 10a of the respective rear fork prongs. At the latter points other elements such as rearwardly and upwardly extending horizontal fender or luggage carrier supporting struts may also be commonly secured. The struts 22 are here shown as integrally joined at the top and locally conformed to the front semi-circumference of tube 15.

In the described usual position of an upper front reach bar or tube, shown in solid lines in FIG. 1, there is represented a hollow tank-like structure designated by the general reference character 25, providing in styling effect both a tank and an upper front reach bar for a boy's type frame. This same structure is shown in dashed outline in an alternative position whereby the frame is converted to a girl's style.

Figure 2:
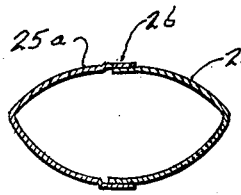
FIG. 2 is a cross section through the tank structure taken as indicated by the line 2—2 in FIG. 1.

Tank 25 is formed by right and left hand longitudinally extended members, substantially mirror images of each other, the top and lower longitudinal margins of which in the median region of the final tank structure are, however, mated and interfitted in telescoped or overlapped relation as may be gathered from FIG. 2. In external form the tank has what might be termed an elongated thin tadpole-like form with a larger front end from which there is a transverse and vertical tapering to the narrow rear end.

As shown in FIG. 2 the median longitudinal edges of one-half of the tank structure, here the right half 25a, are slightly offset so that the other half 25b is received in telescoped relation within the offset edge portions 26. The two halves of the tank are held by a plurality of screws 27 passed through the overlapped edges of the tank elements, for which purpose if desired a local tab or ear may be provided at each screw location projecting beyond the normal longitudinal edges of the internally telescoped portion 25b. Both top and bottom of the tank have at least one such screw as shown at the forward end of the tank at FIG. 2; while if desired, as shown in FIG. 1, a single pair of such screws at the forward end of the tank may be used. Also the frame screws 28 passed through apertures, preferably elongated slots, in the extreme rear end of the tank structure, through the underlying end portion of the upper rear fork structure 22 and into the seat post mast 15, secure at the rear end the two halves of the tank to the seat post mast.

Figure 3:
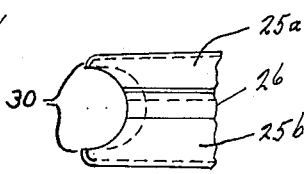
FIG. 3 is a fragmentary detail plan view of the rear end of the tank structure.

As shown in FIG. 3, the back end of the tank is notched to correspond to the curvature of the structure on or of the seat post mast tube to which it is attached, here being the end of the upper rear fork structure 22 which embraces or is wrapped around the forward part of the tube 15. Also as seen in FIG. 3, at the extreme end the heavy sheet metal of each half of the tank at 30 is turned inwardly providing a rounded edge for structural strength and appearance, and also to avoid a free metal edge which would be exposed to possible contact with the person or clothes of a rider.

Figure 4:
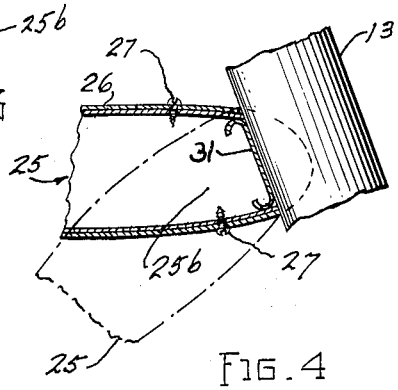
FIG. 4 is a fragmentary side elevation of the front end of the tank partly broken away.

Likewise, at the front end, the tank structure is formed with the edges contoured to fit the front steering post tube 13, embracing the same to the extent of about half its circumference at the region where the tank is attached. A metal clip 31 is secured, by spot welding, brazing or other suitable means, in central location on the back side of the tube 13 at the location where the front end of the tank is to be attached. This clip preferably has rounded upper and lower ends as shown in FIG. 4, and has a length effective to engage opposed central inside surface portions of the positioned tank structure. Preferably the clip is slightly over size in length, so that the tank is stressed slightly when positioned thereon, whereby the tank is more snugly mounted. For simplicity of the overall structure, there is preferred a parallel disposition of head tube 13 and seat post tube 15.

Due to the rearward slant of the tube 13, the correspondingly shaped "notch" at the front of the overall tank structure has an axis similarly rearwardly upwardly sloping when the tank is considered in the disposition shown in solid lines in FIG. 1; and likewise the "notch" on the rear of the tank has a rearwardly upwardly sloping axis, where as preferred the rear end is to be closely conformed to a tubular element to which it is attached.

For attachment of the tank 25 in the position shown in dashed outline in FIG. 1 for a girl's style frame, a transverse bolt hole 41 is provided through the lower portion of the tube 15.

Since a neat, close fit of the front end of the tank about the back part of the heat post tube is desired, and so also a like attachment at the back without any greatly elongated slot or series of apertures in the rear end of the tank, the tank is rotated 180° from that used for a boy's type frame; and further, location of the aperture 41 in seat mast tube 15 is selected at a position where the distance from the center of the clip 31 to the bolt hole 41 is equal to the distance from the center of the clip to the bolts 28; in other words equal to the distance from the centerline of the aligned bolt apertures at the rear of the tank to the vertical and transverse center of that portion of an imaginary circular cylindrical surface (corresponding to the head tube) defined by the metal edges of the tank front notch.

With the structure here shown where the tube 15 is substantially parallel to the tube 13, inversion of the tank 25 to permit the front end of the tank to conform with the cylindrical surface of 13 brings the axis of the tank rear bolt apertures to a location spaced the same distance below as the location of bolt means 28 is spaced above the point of intersection with the axis of 15 of a line drawn perpendicularly thereto from the center of the clip 31.

Whereas, with the tank disposed at the position to form a boy's style frame, the back end is attached to the seat post tube at a location already occupied by the upper end of rear fork 22, when in the lower position the back of the tank directly embraces the tube 15. Hence a single pair of approximately aligned sheet metal screws 27 is used near the forward end to hold the two halves of the tank together, and as shown in FIG. 2 the edges of the half 25b telescoped within 25a are spaced from the shoulders of the offsets 26; so that, when the tank is used in the girl's frame position and embraces the tube 15 directly, the ends of 25a and 25b may approach each other and come into contact with the tube 15 when bolted at the aperture 61 without distortion of the back end of the tank.

As may be seen from the aforegoing description and the drawings, after the rest of the frame is assembled, the two halves of the tank may be positioned as shown in solid lines, the two screws 27 inserted at the forward end engaged by the clip 31, and then the back end secured by the bolt means 28 to provide a boy's style frame; or by a similar procedure the girl's type frame is obtained when the tank is secured in the dashed line position. Thereafter the style may be readily changed merely by unbolting the back end of the tank, inverting and locating the tank in the new position, and securing the back. After an initial assembly, the tank screws 27 need not be removed in effecting a style conversion, since the forward position of the aligned screws and the described edge-shoulder spacing in the telescoped region permits the back end to be spread as needed to clear other structures in the relocation procedure.

By tapering the rear portion of the tank as described and providing some slight curvature over the length as shown, the style determining result of an upper reach bar in a usual boy's type frame is the more effectively attained when the tank is in the top position; and so too the result in a usual girl's frame is furthered by the same means, and also by location of the pedal sprocket hanger housing beneath the lower reach tube. At the upper position, the curvature and taper tend to merge the rear of the tank into the curved struts; while at the lower position, these features emphasize the separation from the lower reach tube and bring the rear end down to a size approaching that of the seat mast tube. The low position of the pedal mounting means avoids any obscuring of such separation by the pedal sprocket or by any chain guard used.

I claim:

1. A knock-down bicycle frame convertible at will from one frame type to the other comprising: a basic frame structure including a lower reach tube, a head post tube and lower rear wheel fork permanently secured on the lower reach tube, a seat mast tube having a saddle element rigidly attached to its bottom end and detachably secured to the lower reach tube, an upper rear fork structure providing a pair of strut portions detachably secured at the upper end to the top region of the seat mast tube, the lower ends of the strut portions being detachably secured to the respective back ends of the prongs of the lower rear fork; anchor means on the upper portion of the head post tube; and an upper reach bar with front end detachably secured on the head post tube by said anchor means and back end selectively secured at the top region of the seat mast tube or on the lower portion of the seat mast tube in spaced relation from the lower reach tube.

2. A frame as described in claim 1 including a second saddle element detachably secured on the bottom side lower reach tube by fastening means securing the first saddle element, said saddle elements including cooperating formations adapted to clamp pedal crank bearing means therebetween.

3. A frame as described in claim 1 wherein the head post tube and seat mast tubes are substantially parallel.

4. A frame as described in claim 3, wherein said upper reach bar is provided by a hollow tank structure having a front end notch shaped to fit the back of the head post tube and a back end notch shaped to receive the seat mast tube.

5. A frame as described in claim 4, wherein said anchor means comprises an element secured to the back of the head post tube and adapted to engage top and bottom inner surface portions of the tank structure.

6. A frame as described in claim 4, wherein said tank structure comprises right and left hand drawn sheet metal stampings with longitudinal margins of one telescoped into the other, and a pair of fastening elements through the top and bottom telescoped margins respectively, said elements being near the front end and permitting a slight pivoting of the stampings whereby the spacing of the rear ends may be varied.

7. A frame as described in claim 1 including a pedal sprocket hanger housing disposed beneath the lower reach tube.

8. A bicycle frame convertible from boy's style to girl's style and vice versa comprising: a basic frame structure including a head post tube, a seat mast tube, and a lower front reach tube; a hollow upper reach bar comprising a tank structure having a front end notch shaped to fit the back of the head post tube and a back end notch shaped to receive the seat mast tube; rearwardly projecting anchor means on the upper portion of the head post tube, said anchor means comprising an element secured to the back of the head post tube and adapted frictionally to engage top and bottom inner surface portions of the tank structure, the front end of said tank structure adapted to be fitted on said anchor means in either of two relatively inverted positions to secure said tank structure on the head post tube, the back end of said tank structure being selectively secured at the top region of the seat mast tube or on the lower portion of the seat mast tube in spaced relation from the lower reach tube.

9. A bicycle frame convertible from boy's style to girl's style and vice versa comprising: a basic frame structure including a head post tube, a seat mast tube, and a lower front reach tube; a hollow upper reach bar comprising a tank structure having a front end notch shaped to fit the back of the head post tube and a back end notch shaped to receive the seat mast tube; said tank structure comprising right and left hand drawn sheet metal stampings with longitudinal margins of one movably telescoped into the other, and a pair of fastening elements through the top and bottom telescoped margins respectively, said elements being near the front end and permitting a slight pivoting of the stampings whereby the spacing of the rear ends may be varied; rearwardly projecting anchor means on the upper portion of the head post tube, the front end of said tank structure adapted to be fitted on said anchor means in either of two relatively inverted positions to secure said tank structure on the head post tube, the back end of said tank structure being selectively secured at the top region of the seat mast tube or on the lower portion of the seat mast tube in spaced relation from the lower reach tube.

10. A bicycle frame convertible from boy's style to girl's style and vice versa comprising: a basic frame structure including a head post tube, a seat mast tube, and a lower front reach tube; a hollow upper reach bar comprising a tank structure having a front end notch shaped to fit the back of the head post tube and a back end notch shaped to receive the seat mast tube; anchor means on the upper portion of the head post tube adapted to engage inner surface portions of the tank structure, the front end of said tank structure adapted to be fitted on said anchor means in either of two relatively inverted positions to secure said tank structure on the head post tube, the back end of said tank structure being selectively secured at the top region of the seat mast tube or on the lower portion of the seat mast tube in spaced relation from the lower reach tube.

References Cited in the file of this patent

UNITED STATES PATENTS

| | | |
|---|---|---|
| 1,863,859 | Kraeft | June 21, 1932 |
| 2,199,536 | Booty | May 7, 1940 |
| 2,747,889 | Mueller | May 29, 1956 |
| 2,798,739 | Schreckengost et al. | July 9, 1957 |
| 2,827,301 | Stevens | Mar. 18, 1958 |
| 2,997,308 | Boudreau | Aug. 22, 1961 |

FOREIGN PATENTS

| | | |
|---|---|---|
| 615,499 | France | Oct. 12, 1926 |